(12) United States Patent
Herbeck et al.

(10) Patent No.: US 8,738,742 B2
(45) Date of Patent: *May 27, 2014

(54) TIERED XML SERVICES IN A CONTENT MANAGEMENT SYSTEM

(71) Applicant: International Business Machines Corporation, Armonk, NY (US)

(72) Inventors: David G. Herbeck, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,788

(22) Filed: Jan. 30, 2013

(65) Prior Publication Data

US 2013/0138782 A1    May 30, 2013

Related U.S. Application Data

(63) Continuation of application No. 12/858,573, filed on Aug. 18, 2010, now Pat. No. 8,495,176.

(51) Int. Cl.
| | | |
|---|---|---|
| G06F 15/16 | (2006.01) | |
| G06F 9/50 | (2006.01) | |
| G06F 17/30 | (2006.01) | |
| H04L 29/08 | (2006.01) | |
| H04L 29/06 | (2006.01) | |

(52) U.S. Cl.
CPC ........ *G06F 9/5055* (2013.01); *G06F 17/30908* (2013.01); *G06F 17/30911* (2013.01); *G06F 17/30923* (2013.01); *G06F 17/30867* (2013.01); *G06F 17/3089* (2013.01); *H04L 29/08072* (2013.01); *H04L 65/40* (2013.01); *H04L 69/329* (2013.01); *Y10S 707/912* (2013.01); *Y10S 707/99941* (2013.01); *Y10S 707/99942* (2013.01); *Y10S 707/99944* (2013.01); *Y10S 707/99945* (2013.01)
USPC ........... 709/219; 709/201; 709/203; 709/205; 709/217; 709/218; 709/223; 709/224; 709/226; 709/227; 709/231; 709/248; 707/999.1; 707/999.101; 707/999.103; 707/999.104; 707/790; 707/791; 707/792; 707/797; 707/802; 707/803; 707/804; 707/809; 707/810; 707/811; 707/E17.127; 707/634; 707/600; 707/912; 707/821; 715/234; 715/235; 715/236; 715/237; 715/238; 715/239; 715/240; 715/242; 715/243; 715/249; 715/250; 707/999.1

(58) Field of Classification Search
CPC ............ G06F 9/5055; G06F 17/30908; G06F 17/30911; G06F 17/30923; G06F 17/30867; G06F 17/3089; H04L 29/08072; H04L 65/40; H04L 69/329; H04L 2209/60; H04L 41/00; H04L 41/08; H04L 41/12; H04L 63/123
USPC ......... 709/201, 203, 217, 218, 219, 223, 224, 709/227, 248, 205, 226, 231; 707/100, 101, 707/103, 999.1, 999.101, 999.103, 999.104, 707/790, 791, 792, 797, 802, 803, 804, 809, 707/810, 811, E17.127, 634, 600, 912, 821; 715/503, FOR. 213, 513, FOR. 223, 715/517, FOR. 227, 523, FOR. 233, 234, 715/235, 236, 237, 238, 239, 240, 242, 243, 715/249, 250; 714/25, 38, 43, 738, 739
See application file for complete search history.

(56) References Cited

U.S. PATENT DOCUMENTS

| | | | | |
|---|---|---|---|---|
| 6,865,605 | B1 * | 3/2005 | Soderberg et al. | 709/226 |
| 6,873,995 | B2 * | 3/2005 | Benson et al. | 707/607 |
| 6,950,848 | B1 * | 9/2005 | Yousefi'zadeh | 709/203 |
| 7,181,680 | B2 * | 2/2007 | Lin et al. | 715/229 |
| 7,752,542 | B2 * | 7/2010 | Cragun et al. | 715/236 |
| 7,792,979 | B1 * | 9/2010 | Randall et al. | 709/229 |
| 8,001,232 | B1 * | 8/2011 | Saulpaugh et al. | 709/224 |
| 8,135,796 | B1 * | 3/2012 | Slaughter et al. | 709/217 |
| 8,180,769 | B2 * | 5/2012 | Liu et al. | 707/732 |
| 2002/0087366 | A1 * | 7/2002 | Collier et al. | 705/5 |
| 2002/0090934 | A1 * | 7/2002 | Mitchelmore | 455/412 |
| 2002/0147713 | A1 * | 10/2002 | Smith | 707/3 |

| | | | | |
|---|---|---|---|---|
| 2003/0182450 | A1* | 9/2003 | Ong et al. | 709/246 |
| 2003/0200212 | A1* | 10/2003 | Benson et al. | 707/7 |
| 2003/0200218 | A1* | 10/2003 | Tijare et al. | 707/100 |
| 2003/0225894 | A1* | 12/2003 | Ito | 709/227 |
| 2004/0034540 | A1* | 2/2004 | Chen et al. | 705/1 |
| 2004/0143597 | A1* | 7/2004 | Benson et al. | 707/104.1 |
| 2004/0205656 | A1* | 10/2004 | Reulein et al. | 715/530 |
| 2004/0215635 | A1* | 10/2004 | Chang et al. | 707/100 |
| 2004/0221226 | A1* | 11/2004 | Lin et al. | 715/501.1 |
| 2005/0015491 | A1* | 1/2005 | Koeppel | 709/226 |
| 2005/0091198 | A1* | 4/2005 | Dettinger et al. | 707/3 |
| 2006/0020596 | A1* | 1/2006 | Liu et al. | 707/6 |
| 2006/0031216 | A1* | 2/2006 | Semple et al. | 707/4 |
| 2006/0059167 | A1* | 3/2006 | Burgel et al. | 707/100 |
| 2006/0271974 | A1* | 11/2006 | Gaydos et al. | 725/86 |
| 2006/0274761 | A1* | 12/2006 | Error et al. | 370/396 |
| 2007/0050412 | A1* | 3/2007 | Robertson et al. | 707/104.1 |
| 2007/0156774 | A1* | 7/2007 | Gomes | 707/200 |
| 2007/0192242 | A1* | 8/2007 | Kunz | 705/38 |
| 2007/0271306 | A1* | 11/2007 | Brown et al. | 707/200 |
| 2008/0027749 | A1* | 1/2008 | Meyer et al. | 705/1 |
| 2008/0065405 | A1* | 3/2008 | Adelman et al. | 705/1 |
| 2008/0071901 | A1* | 3/2008 | Adelman et al. | 709/223 |
| 2008/0154977 | A1* | 6/2008 | Schmidt | 707/201 |
| 2008/0172391 | A1* | 7/2008 | Adelman et al. | 707/9 |
| 2008/0183674 | A1* | 7/2008 | Bush et al. | 707/3 |
| 2008/0201328 | A1* | 8/2008 | Da Silva et al. | 707/6 |
| 2009/0030941 | A1* | 1/2009 | Jacobs | 707/104.1 |
| 2009/0077043 | A1* | 3/2009 | Chang et al. | 707/3 |
| 2009/0100147 | A1* | 4/2009 | Igarashi | 709/218 |
| 2009/0276505 | A1* | 11/2009 | Imai | 709/219 |
| 2009/0300656 | A1* | 12/2009 | Bosworth et al. | 719/320 |
| 2010/0205178 | A1* | 8/2010 | Bush et al. | 707/737 |
| 2010/0262686 | A1* | 10/2010 | Adelman et al. | 709/223 |
| 2011/0258224 | A1* | 10/2011 | Hagerty | 707/769 |
| 2012/0072490 | A1* | 3/2012 | Randall et al. | 709/203 |

OTHER PUBLICATIONS

"XML Content Servers vs. Content Management Systems," formerly The Mark Logic CEO Blog, written by Dave Kellogg, CEO of Mark Logic Corporation, http://marklogic.blogspot.com/2006/05/xml-content-servers-vs-content.html.

IBM—Healthcare industry, "InThe SmarterCity, doctors focus on people, not paperwork," http://www-935.ibm.com/services/us/gbs/bus/html/bcs_healthcare.html.

"IBM—WebSphere DataPower SOA Appliances," http://www-01.ibm.com/software/integration/datapower/.

* cited by examiner

*Primary Examiner* — Saket K Daftuar (74) *Attorney, Agent, or Firm* — Martin & Associates, LLC; Derek P. Martin (57) ABSTRACT

A content management system (CMS) includes a value-add application with a first set of XML content services, one or more dedicated XML processing servers with a second and other sets of XML content services, and a core CMS with a third set of XML content services. The content management system may be designed to provide XML content services at any of these three tiers of processing. A first threshold is defined that allows the value-add application to determine when to offload XML content services to a dedicated XML processing server. A second threshold is defined that allows the core CMS to determine when to offload XML content services to a dedicated XML processing server. Callback services are included that allow each tier of XML content services to send or receive additional information to complete the XML processing. The result is a content management system that is very powerful and flexible.

6 Claims, 9 Drawing Sheets

| Specifications for CMS with Value-add Application |
|---|
| Linking performed in Value-add application |
| Linking offloaded to Dedicated XML Processing Server if Required Memory > 10 MB |
| Bursting performed in Value-add application |
| Bursting offloaded to Dedicated XML Processing Server if Required Memory > 10 MB |
| Synchronization performed in Core CMS |
| Synchronization offloaded to Dedicated XML Processing Server if Required Memory > 15 MB |

| |
|---|
| 1. User imports an XML document containing links to images to Value-add |
| 2. Import Action is executed in the Application Code of Value-add |
| 3. Import Action of Application Code calls XML Broker of Value-add |
| 4. XML Request Broker in Value-add determines to offload XML processing to Dedicated XML Processing Server due to memory footprint of 12 MB exceeding threshold of 10 MB |
| 5. XML Request Broker stores XML file in Shared File System or Distributed Cache |
| 6. XML Request Broker in Value-add calls XML Content Services in Dedicated XML Processing Server |
| 7. XML Content Services in Dedicated XML Processing Server reads file from Cache, parses the file, and stores the Document Object Model (DOM) in a HashMap |
| 8. Linking module evaluates link rules and determines more files are needed from client |
| 9. XML Content Services in Dedicated XML Processing Server sends reply to XML Request Broker in Value-add requesting the missing files |
| 10. XML Request Broker forwards request for missing files to Import XML Action in Application Code |
| 11. Import XML action in Application Code sends message to client to upload missing files |
| 12. Client uploads missing files |
| 13. Import XML action in Application Code calls XML Broker of Value-add |
| 14. XML Request Broker stores missing files in Cache |
| 15. XML Request Broker in Value-add calls XML Content Services in Dedicated XML Processing Server using same key as first call |
| 16. XML Content Services checks DOM map previously created |
| 17. XML Content Services reads missing files from Cache using existing DOM |
| 18. XML Content Services performs Linking and Bursting |
| 19. During processing, XML Content Services calls XML Request Broker, which calls XML Callback Services to import any objects into the repository |
| 20. XML Callback Services calls Import function in Application Code to import objects |
| 21. Application Code calls Import function in Core CMS to import objects |
| 22. XML Content Services in Dedicated XML Processing Server sends reply to XML Request Broker in Value-add that Linking and Bursting were successful |
| 23. XML Request Broker in Value-add sends reply to Import Action in Application Code that Linking and Bursting were successful |
| 24. XML Request Broker in Value-add calls Synchronization Action in CMS Code |
| 25. Synchronization Action in CMS Code calls XML Request Broker in Core CMS |
| 26. XML Request Broker in Core CMS determines to use Local XML Content Services in Core CMS because memory footprint of 12 MB does not exceed threshold of 15 MB |
| 27. Local XML Content Services in Core CMS performs Synchronization |
| 28. Local XML Content Services in Core CMS sends reply to XML Request Broker in Core CMS that Synchronization was successful |
| 29. XML Request Broker in Core CMS sends message to Import Action in Application Code that Synchronization was successful |

FIG. 10

TIERED XML SERVICES IN A CONTENT MANAGEMENT SYSTEM

BACKGROUND

1. Technical Field

This disclosure generally relates to content management systems, and more specifically relates to services relating to eXtensible Markup Language (XML) in content management systems.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Many content management systems are used in situations that require specialized functions not provided by the core content management system. In these situations, a value-add application is typically provided that provides the specialized functions while still taking advantage of much of the functionality of the core content management system. For example, the pharmaceutical industry is heavily regulated, and a value-add application specific to the pharmaceutical industry may be provided that interfaces with a core content management system.

Figure 2:
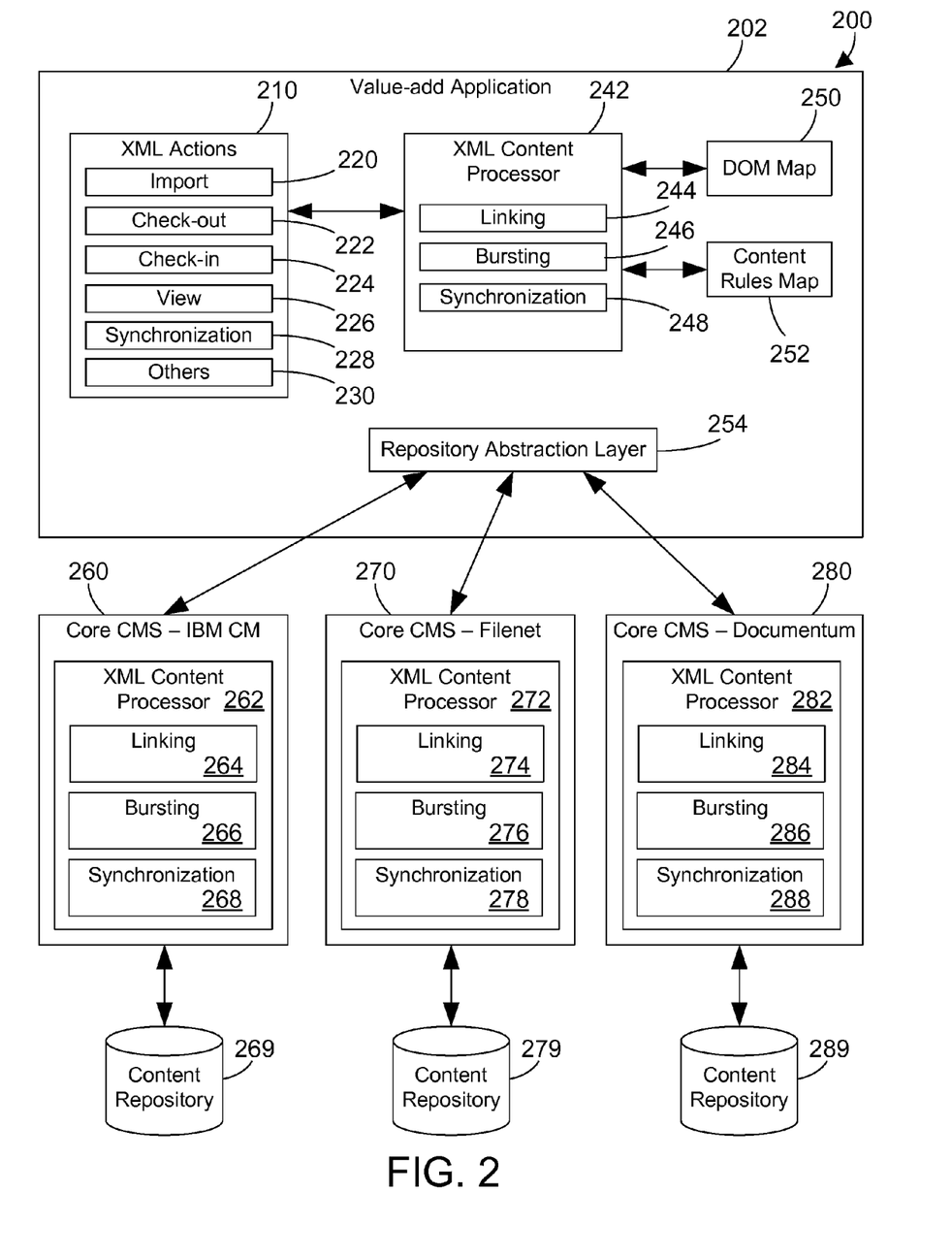
FIG. 2 is a block diagram of one possible implementation of a content management system.

FIG. 2 shows one specific implementation of a content management system 200 that includes a value-add application 202 that can interface with one or more core content management systems 260, 270 and 280. The value-add application 202 includes XML actions 210 that may be performed, an XML content processor 242, and a repository abstraction layer 254. The XML actions may include import 220, check-out 222, check-in 224, view 226, synchronization 228, and other functions 230. The XML actions are processed by the XML content processor 242. Some of the functions provided by the XML content processor 242 include linking 244, bursting 246, and synchronization 248. The XML content processor 242 may write one or more document object model (DOM) objects to a DOM map 250. XML content processor 242 can perform functions using content rules, which may be stored in a content rules map 252 that defines rules that the XML content processor 242 follows when performing certain XML functions. The repository abstraction layer 254 provides a level of abstraction that allows the value-add application 202 to interface to a number of different core content management systems. In the specific example in FIG. 2, the value-add application 202 may interface through the repository abstraction layer 254 to a core CMS 260 that is an IBM content management system, to a core CMS 270 that is a Filenet system, and to a core CMS 280 that is a Documentum system. Each core content management system typically provides its own XML content processor with logic to perform linking, bursting and synchronization. Thus, core CMS 260 includes an XML content processor 262 that provides linking 264, bursting 266, and synchronization 268; core CMS 270 includes an XML content processor 272 that provides linking 274, bursting 276, and synchronization 278; and core XMS 280 includes an XML content processor 282 that provides linking 284, bursting 286, and synchronization 288. Each core CMS controls content in a content repository. Thus, core CMS 260 controls content in content repository 269; core CMS 270 controls content in content repository 279; and core CMS 280 controls content in content repository 289.

Because the value-add application 202 typically has unique requirements that must be met, often the XML content processor 242 with its associated linking 244, bursting 246 and synchronization 248 may be used exclusively by the value-add application, and the XML content processor with its associated linking, bursting and synchronization in the core CMS is not used. While it is possible for the value-add application to call low-level application programming interfaces (APIs) in the core CMS to manage content in the content repository, doing so makes the value-add application 202 designed to the details of the underlying core CMS instead of taking advantage of the repository abstraction layer 254. In addition, if data comes into the repository from sources other than the value-add application 202, the data processed by the XML content processor in the core CMS will be processed differently than data processed by the XML content processor 242 in the value-add application 202. Thus, in environments where data may be imported directly by the core CMS, the processing provided by the value-add application 202 is not available. In addition, some documents are large and therefore create significant memory requirements on the value-add application. Without a way to implement XML content services in a way that overcomes these disadvantages, known content management systems will continue to be plagued by the problems discussed above.

BRIEF SUMMARY

A content management system (CMS) includes a value-add application with a first set of XML content services, one or more dedicated XML processing servers with a second and other sets of XML content services, and a core CMS with a third set of XML content services. The content management system may be designed to provide XML content services at any of these three tiers of processing. A first threshold is defined that allows the value-add application to determine when to offload XML content services to a dedicated XML processing server. A second threshold is defined that allows the core CMS to determine when to offload XML content services to a dedicated XML processing server. Callback services are included that allow each tier of XML content services to send or receive information to complete the XML processing. The result is a content management system that is very powerful and flexible, and can be implemented using various different core content management systems.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a list of steps to illustrate function of the content management system shown in FIG. 3 assuming the specifications shown in FIG. 7 for a specific scenario assuming a particular implementation within the content management system.

DETAILED DESCRIPTION

Many known content management systems use extensible markup language (XML) due to its flexibility and power in managing diverse and different types of content. One known value-add content management system that uses XML is Solution for Compliance in a Regulated Environment (SCORE) developed by IBM Corporation. XML is growing in popularity, and is quickly becoming the preferred format for authoring and publishing. While the discussion herein is in terms of XML documents, XML elements and XML processing, one skilled in the art will recognize these concepts apply equally as well to things that are not implemented in XML.

A content management system includes a value-add application, one or more dedicated XML processing servers, and a core CMS. The value-add application includes a first set of XML content services. The one or more dedicated XML processing servers each include a set of XML content services. The core CMS includes a third set of XML content services. The content management system may be designed to provide XML content services at any of these three tiers of processing. A first threshold is defined that allows the value-add application to determine when to offload XML content services to a dedicated XML processing server. A second threshold is defined that allows the core CMS to determine when to offload XML content services to a dedicated XML processing server. Callback services are included that allow each tier of XML content services to send or receive information to complete the XML processing. The result is a content management system that is very powerful and flexible, and can be implemented using various different core content management systems.

Figure 1:
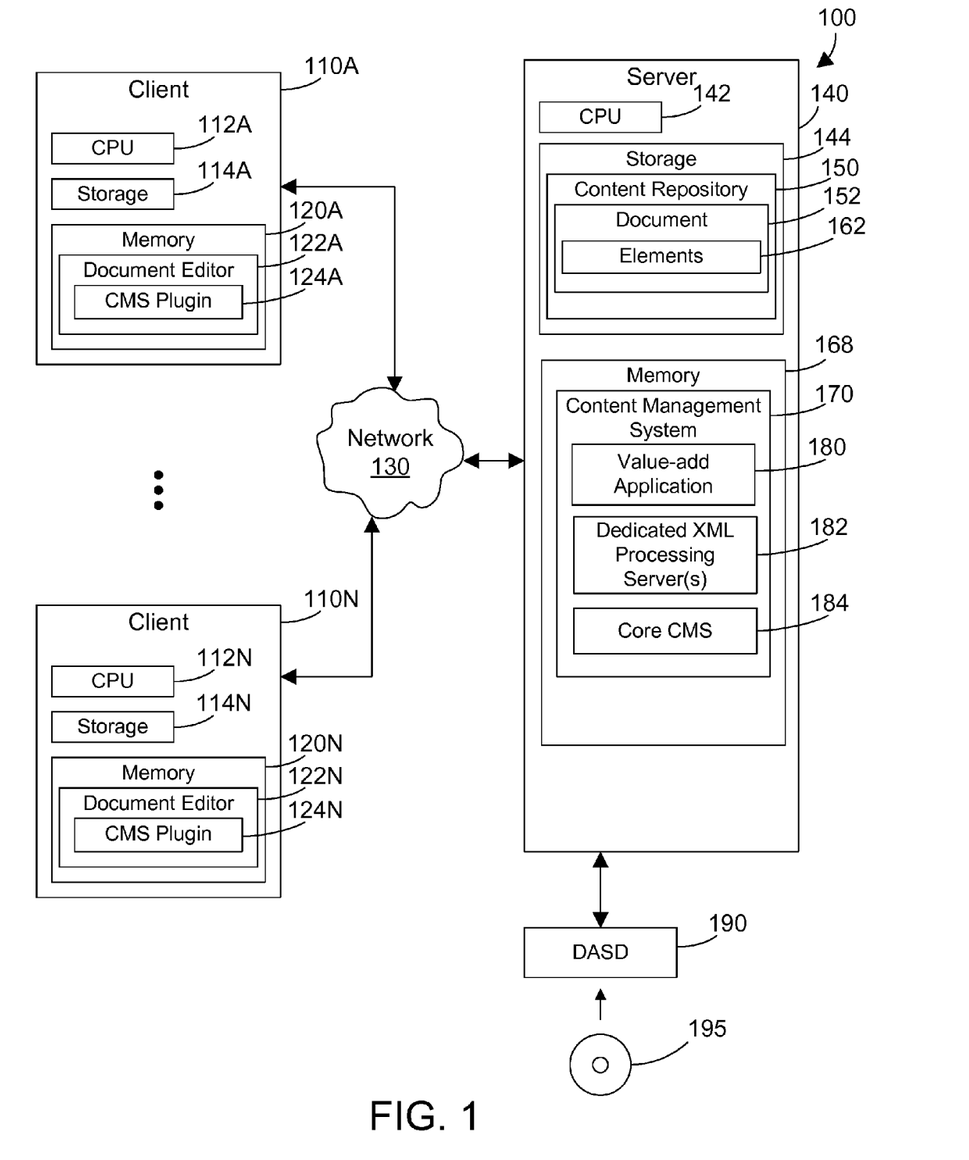
FIG. 1 is a block diagram of a networked computer system that includes a server computer system that has a content management system.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 168 of a server computer system 140 that also includes a CPU 142 and storage 144 that includes a content repository 150 that holds one or more documents 152 (i.e., content) managed by the CMS 170. Document 152 may include one or more elements 162. The term "element" means any section or portion of a document that may be individually displayed or operated on, whether actually in the document or linked to the document.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a value-add application 180, one or more dedicated XML processing servers 182, and a core CMS 184. Details regarding the value-add application 180, dedicated XML processing server(s) 182, and core CMS 184 are provided below with reference to FIG. 3 and other figures. While the value-add application 180, the dedicated XML processing server(s) 182, and core CMS 184 are shown in FIG. 1 to reside in the same memory in a single server, this is shown for the purpose of illustration. These three items 180, 182 and 184 may be implemented in three different server computer systems instead of on a single server computer system.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 168 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 168, storage 144 and DASD device 190. Therefore, while data, the operating system, and content management system 170 may reside in main memory 168, those skilled in the art will recognize that these items are not necessarily all completely contained in main memory 168 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 168. Main memory 168 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
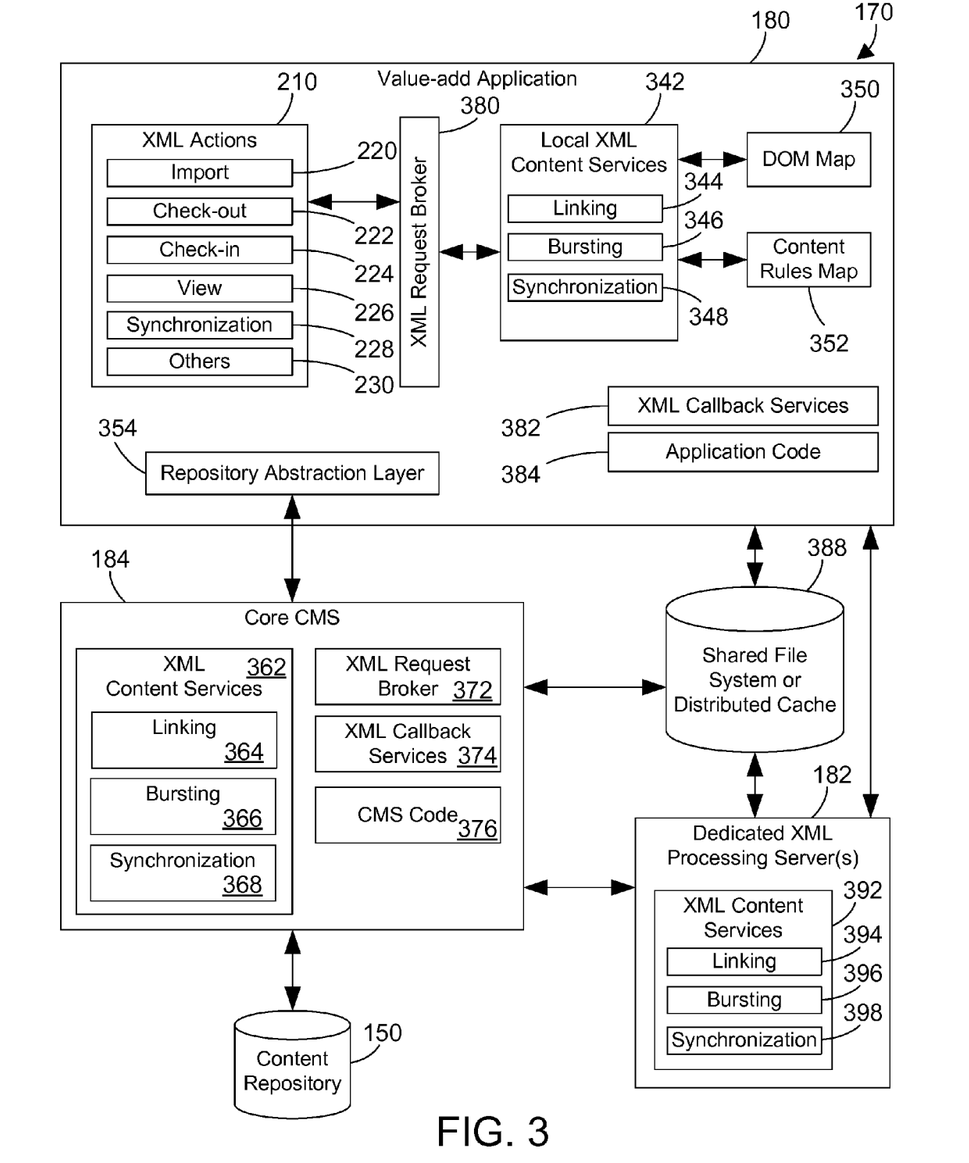
FIG. 3 is a block diagram of a content management system that provides tiered XML content services.

FIG. 3 shows additional details of the content management system 170 shown in FIG. 1. The value-add application 180 includes XML actions 210 that include import 220, check-out 222, check-in 224, view 226, synchronization 228, and others 230. The XML actions 210 communicate with an XML request broker 380. The XML request broker 380 knows which tiers of XML processing are defined in the content management system 170, and directs requests for XML content services to the appropriate tier. Local XML content services 342 are defined to include any suitable XML content services that may need to be processed in the value-add application. Linking 344, bursting 346 and synchronization 348 are examples of XML content services that could be provided by the local XML content services 342. The local XML content services 342 preferably communicates with a DOM map 350 and content rules map 352. The value-add application 180 further includes XML callback services 382, application code 384 and a repository abstraction layer 354. The XML callback services 382 are services that may be called by the local XML content services 342 when information needs to be sent or received in response to the local XML content services 342 processing a requested XML content service. For example, if an XML content service does not have all the information it needs to complete its job, the local XML content service 342 may call an XML callback service in the XML callback services 382 to obtain the needed information. In another example, when an XML content service has finished its work, it may call an XML callback service to indicate some work that needs to be performed (such as checking in content after bursting once the bursting by the XML content service is complete). The application code 384 represents the software in the value-add application 180 that provides the core logic needed for the value-add application 180 to function properly. The repository abstraction layer 354 provides an interface that allows the value-add application 180 to be coupled to a core CMS from a variety of different vendors. The value-add application 180 communicates with the core CMS 184 via the repository abstraction layer 354, and the core CMS 184 communicates with the value-add application 180 via the repository abstraction layer 354. While a single core CMS is shown in FIG. 3, the disclosure and claims herein expressly extend to a value-add application that is coupled to multiple core CMSs.

The core CMS 184 preferably includes its own set of XML content services 362, shown in FIG. 3 as linking 364, bursting 366, and synchronization 368. The core CMS 184 also includes an XML request broker 372, XML callback services 374, and CMS code 376. The XML request broker 372 and XML callback services 374 perform similar functions to the XML request broker 380 and XML callback services 382 in the value-add application 180, as discussed above. The CMS code 376 represents the software in the core CMS 184 that provides the core logic needed for the core CMS 184 to function properly.

The content management system 170 in FIG. 3 further includes a shared file system or distributed cache 388, and one or more dedicated XML processing servers 182. The shared file system or distributed cache 388 stores XML or related content that may be processed by the value-add application 180, the core CMS 184, and the one or more dedicated XML processing servers 182. Each dedicated XML processing server preferably includes its own tier of XML content services 392, which may include any suitable XML content service, including linking 394, bursting 396, and synchronization 398.

The value-add application 180 preferably includes a first threshold used by the XML request broker 380 to determine when to route a requested XML content service to the local XML content services 342, and when to route the requested XML content service to a dedicated XML processing server 182. The first threshold may be any suitable criteria that may be specified by the user. In one preferred implementation, the first threshold relates to resources in the content management system 170. In the most preferred implementation, the first threshold relates to estimated use of memory by the requested XML content service. Note the estimated use of memory is related to the size of a document that needs to be processed using the requested XML content service. Thus, when the estimated use of memory is less than the first threshold, the XML request broker 380 will route the requested XML content service to the local XML content services 342 in the value-add application 180. When the estimated use of memory is greater than the first threshold, the XML request broker 380 will route the requested XML content service to a dedicated XML processing server 182. Note the dedicated XML processing server 182 is preferably implemented on a separate server computer system than the value-add application 180, allowing the value-add application 180 to offload compute-intensive XML content services to an external dedicated XML processing server 182.

The core CMS 184 preferably includes a second threshold used by the XML request broker 372 to determine when to route a requested XML content service to the local XML content services 362, and when to route the requested XML content service to a dedicated XML processing server 182. The second threshold may be any suitable criteria that may be specified by the user. In one preferred implementation, the second threshold relates to resources in the content management system 170. In the most preferred implementation, the second threshold relates to estimated use of memory by the requested XML content service. Thus, when the estimated use of memory is less than the second threshold, the XML request broker 372 will route the requested XML content service to the local XML content services 362 in the core CMS 184. When the estimated use of memory is greater than the second threshold, the XML request broker 372 will route the requested XML content service to a dedicated XML processing server 182, allowing the core CMS 184 to offload compute-intensive XML content services to an external dedicated XML processing server 182. Note the dedicated XML processing server may be the same dedicated XML processing server used by the value-add application 180, or may be a different dedicated XML processing server than the dedicated XML processing server used by the value-add application 180.

Note the different tiers of XML content services shown in FIG. 3. The value-add application 180 includes its own local XML content services 342; the core CMS 184 includes its own local XML content services 362; and one or more dedicated XML processing servers 182 may include their own XML content services 392. By providing XML content services at three different tiers in the content management system 170, the system architect that defines the content management system 170 has great flexibility in determining where and how to implement the needed XML content services.

Figure 4:
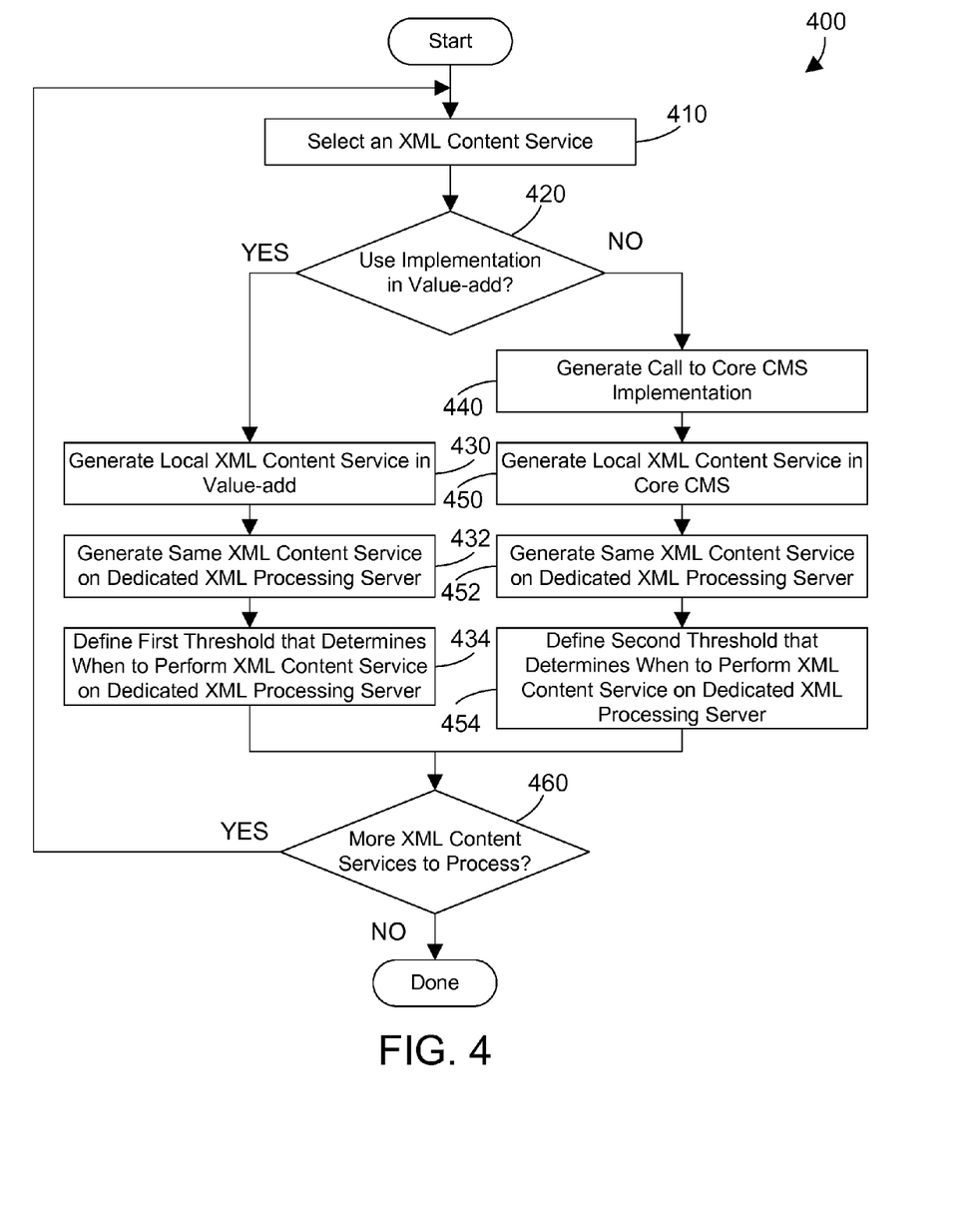
FIG. 4 is a flow diagram of a method for designing a content management system such as that shown in FIG. 3.

FIG. 4 shows a method 400 that may be used by a system architect to define various tiers of XML content services in the content management system. First, an XML content service is selected (step 410). If the selected XML content service is to be implemented in the value-add application (step 420=YES), a local XML content service for the selected XML content service is generated in the value-add application (step 430). The same XML content service may also be generated on a dedicated XML processing server (step 432). A first threshold is then defined that determines when to perform the XML content service on the dedicated XML processing server (step 434). As discussed above, one suitable implementation for the threshold is use of memory by the XML content service. When the use of memory by the XML content service exceeds the threshold, the processing of the XML content service can be offloaded to a dedicated XML processing server that has additional resources that enhance the efficiency of processing the selected XML content service. If the implementation in the value-add application is not used (step 420=NO), this means the implementation in the core CMS is used, so a call is generated to the core CMS implementation of the selected XML content service (step 440). The local XML content service in the core CMS is generated (step 450). The same XML content service is then generated on a dedicated XML processing server (step 452), and a second threshold is defined that determines when to perform the selected XML content service on a dedicated XML processing server (step 454). Note the dedicated XML processing server referenced in steps 434 and 454 may be the same dedicated XML processing server, or may be different dedicated XML processing servers. When there are more XML content services to process (step 460=YES), the next XML content service is selected in step 410, and method 400 continues until there are no more XML content services to process (step 460=NO). Method 400 is then done. Using method 400, a system architect designing the content management system 170 can decide where each XML content service is defined, and can further define one or more thresholds that determine when the selected XML content service can be offloaded to a dedicated XML processing server.

Figure 5:
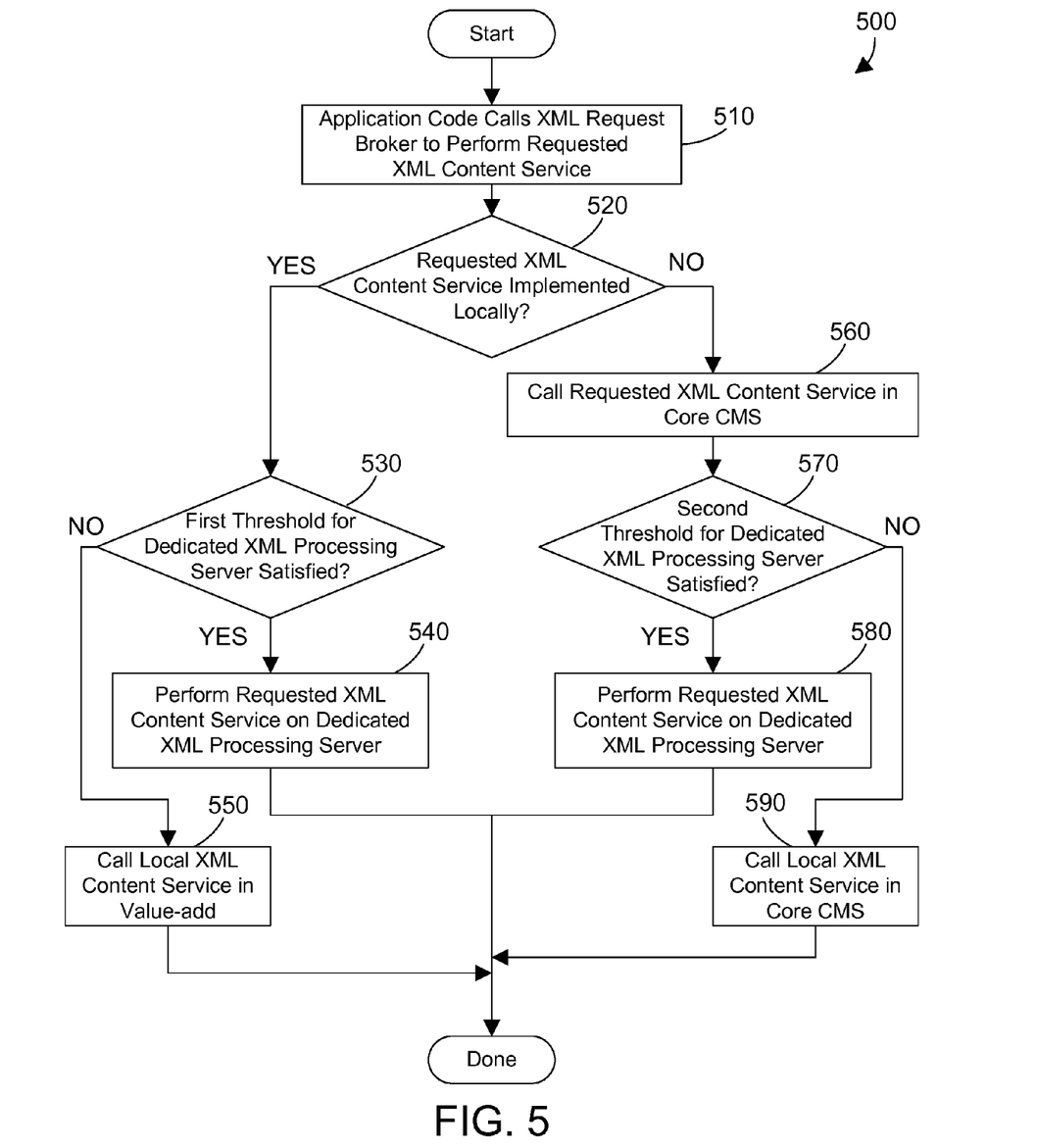
FIG. 5 is a flow diagram of a method for determining at what tier to perform a requested XML content service.

Referring to FIG. 5, a method 500 shows the high-level function of the content management system 170 at run-time (i.e., after the system architect has performed method 400 in FIG. 4). First, we assume the application code in the value-add application calls the XML request broker to perform a requested XML content service (step 510). When the requested XML content service is implemented locally (step 520=YES), meaning the XML content service is implemented within the value-add application, the XML request broker then determines when the first threshold for the dedicated XML processing server is satisfied (step 530). When the first threshold for the dedicated XML processing server is satisfied (step 530=YES), the requested XML content service is performed on the dedicated XML processing server (step 540). When the first threshold for the dedicated XML processing server is not satisfied (step 530=NO), the local XML content service in the value-add application is called (step 550). When the requested XML content service is not implemented locally (step 520=NO), meaning the XML content service is not implemented within the value-add application, a call is generated to the requested XML content service in the core CMS (step 560). The XML broker determines whether the second threshold for the dedicated XML processing server is satisfied (step 570). When the second threshold for the dedicated XML processing server is satisfied (step 570=YES), the requested XML content service is performed on a dedicated XML processing server (step 580). When the second threshold for the dedicated XML processing server is not satisfied (step 570=NO), the local XML content service in the core CMS is called (step 590). Method 500 is then done.

Figure 6:
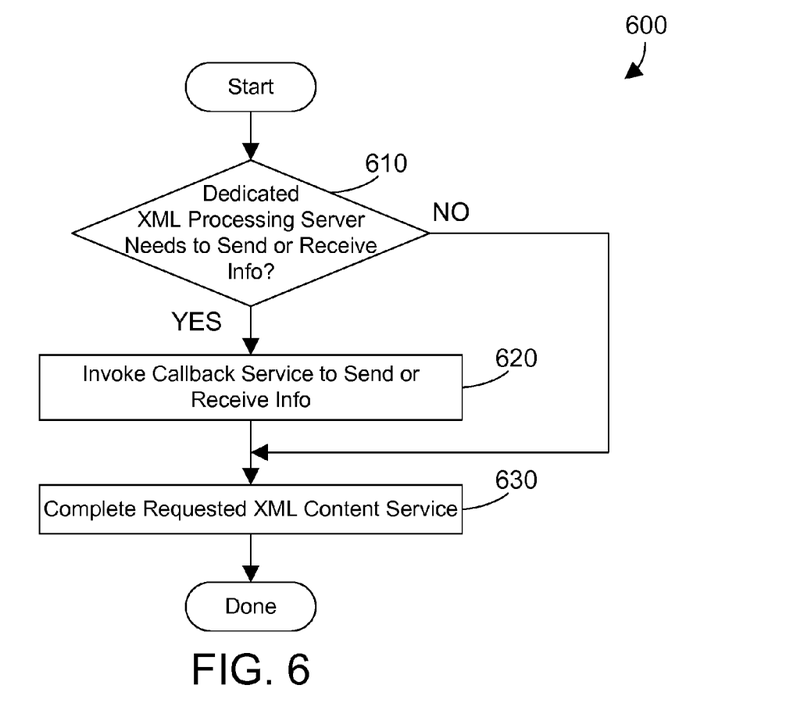
FIG. 6 is a flow diagram showing steps that could be included in steps 540 and 580 in FIG. 5.

While a dedicated XML processing server is performing the requested XML content service in steps 540 or 580 in FIG. 5, the dedicated XML processing server may need to send or receive information via one or more callback services to complete its task. Method 600 determines when the dedicated XML processing server needs to send or receive information to complete its task (step 610). When the dedicated XML processing server needs to send or receive information to complete its task (step 610=YES), one or more callback services may be invoked to send or receive the needed information (step 620). When the dedicated XML processing server does not need to send or receive information to complete its task (step 610=NO), step 620 is skipped. The requested XML content service is then completed (step 630).

Figure 7:
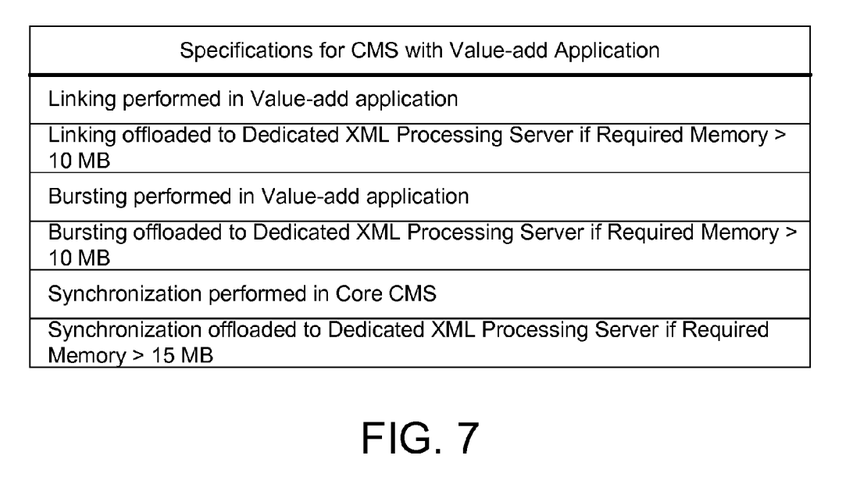
FIG. 7 shows specifications for a sample CMS with a value-add application to illustrate multi-tiered XML content services.

A simple example is now presented to illustrate the concepts described in general terms above. Referring to FIG. 7, specifications for a content management system with a value-add application state: linking is performed in the value-add application; linking is offloaded to a dedicated XML processing server if the required memory for the linking exceeds 10 megabytes (MB); bursting is performed in the value-add application; bursting is offloaded to a dedicated XML processing server if the required memory for the bursting exceeds 10 MB; synchronization is performed in the core CMS; and synchronization is offloaded to a dedicated XML processing server if the required memory for the synchronization exceeds 15 MB. Referring to FIG. 3, we assume for this example the system architect of the content management system implements the appropriate logic in the value-add application 180, the core CMS 184, and the one or more dedicated XML processing servers 182 to meet the specifications in FIG. 7. We now consider the run-time behavior of the content management system 170 once configured according to the specifications in FIG. 7.

Figure 8:
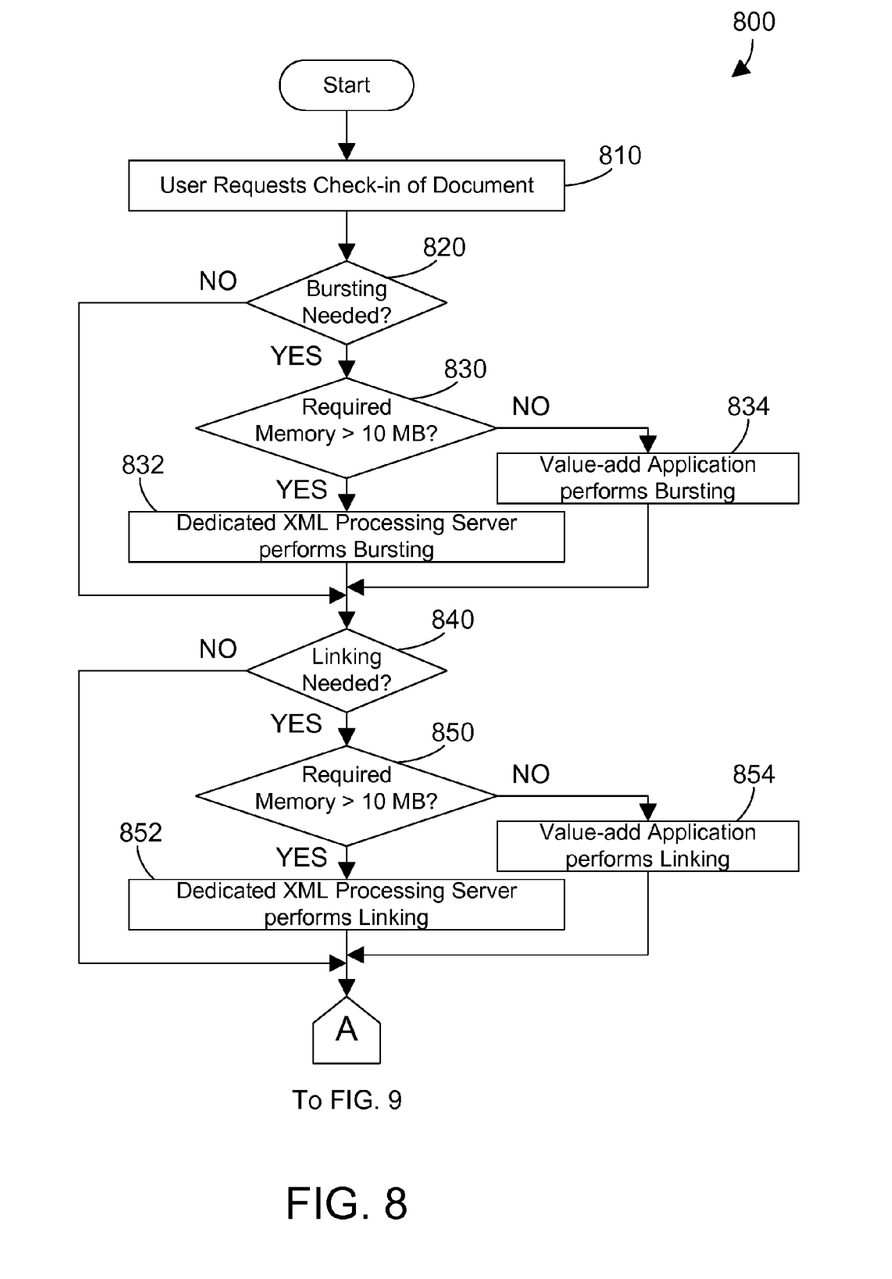
FIG. 8 is a first portion of a flow diagram of a method for performing XML content services in response to a user checking in a document to the repository.
Figure 9:
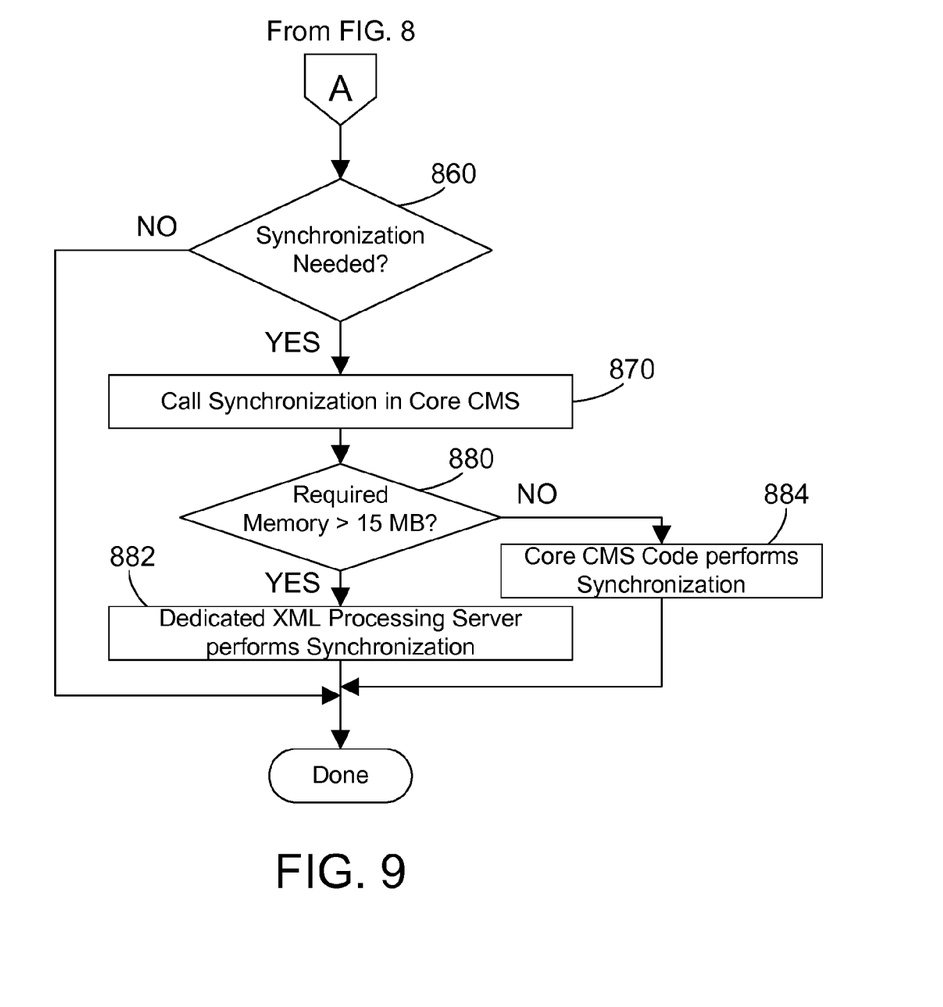
FIG. 9 is a second portion of the flow diagram in FIG. 8 of the method for performing XML content services in response to a user checking in a document to the repository.

A method 800 is shown in the flow diagram in FIGS. 8 and 9. We assume for this example a user requests check-in of a document (step 810). When bursting is needed during the check-in of the document (step 820=YES), when the required memory for the bursting is greater than the 10 MB first threshold (step 830=YES), the dedicated XML processing server performs the bursting (step 832). When the required memory for the bursting is less than the 10 MB first threshold (step 830=NO), the value-add application performs the bursting (step 834). When linking is needed (step 840=YES), when the required memory is greater than the 10 MB first threshold (step 850=YES), the dedicated XML processing server performs the linking (step 852). When the required memory is less than the 10 MB threshold (step 850=NO), the value-add application performs the linking (step 854). When synchronization is needed (step 860=YES), the synchronization in the core CMS is called (step 870). When the required memory for the synchronization is greater than the 15 MB second threshold (step 880=YES), a dedicated XML processing server performs the synchronization (step 882). When the required memory for the synchronization is less than the 15 MB second threshold (step 880=NO), the core CMS performs the synchronization (step 884). Method 800 in FIGS. 8 and 9 shows how easily the CMS content services at different tiers in the content management system may be used according to the specifications for the content management system.

A detailed example is now given in FIG. 10 to again illustrate function of the content management system 170 when configured according to the specifications in FIG. 7 for a specific XML content service. First, a user imports an XML document containing links to images to the value-add application (step 1). The import action is executed in the application code of the value-add application (step 2). The import action of the application code calls the XML broker of the value-add application (step 3). We assume for this specific example the document imported by the user has a memory footprint of 12 MB. The XML request broker in the value-add application then determines to offload the XML processing to a dedicated XML processing server because the memory footprint of 12 MB exceeds the first threshold of 10 MB (step 4). The XML request broker in the value-add application stores the XML file in the shared file system or distributed cache (step 5). Note from this point the shared file system or distributed cache is referred to simply as "cache." The XML request broker in the value-add application calls XML content services in the dedicated XML processing server (step 6). The XML content services in the dedicated XML processing server reads the file from the cache, parses the file, and stores the Document Object Model (DOM) in a Hashmap (step 7). The linking module evaluates the link rules and determines more files are needed from the client (step 8). The XML content services in the dedicated XML processing server sends a reply to the XML request broker in the value-add application requesting the missing files (step 9). The XML request broker forwards the request for the missing files to the import XML action in the application code (step 10). The import XML action in the application code sends a message to the client to upload the missing files (step 11). The client then uploads the missing files (step 12). Note that steps 11 and 12 may involve user participation, or may be performed by the user's client computer system without the user's participation. The import XML action in the application code then calls the XML broker of the value-add application (step 13). The XML request broker stores the missing files in the cache (step 14). The XML request broker in the value-add application then calls the XML content services in the dedicated XML processing server using the same key as the first call (step 15). The XML content services checks the DOM map previously created (step 16). The XML content services reads the missing files from the cache using the existing DOM (step 17). The XML content services performs the linking and bursting (step 18). During processing, the XML content services calls the XML request broker, which calls the XML callback services to import any objects into the repository (step 19). The XML callback services calls the import function in the application code to import the objects (step 20). The application code calls the import function in the core CMS to import the objects (step 21). The XML content services in the dedicated XML processing server sends a reply to the XML request broker in the value-add application that linking and bursting were successful (step 22). The XML request broker in the value-add sends a reply to the import action in the application code that linking and bursting were successful (step 23). The XML request broker in the value-add application then calls the synchronization action in the CMS code (step 24). The synchronization action in the CMS code calls the XML request broker in the core CMS (step 25). The XML request broker in the core CMS determines to use local XML content services in the core CMS because the memory footprint of 12 MB does not exceed the second threshold of 15 MB (step 26). The local XML content services in the core CMS then performs the synchronization (step 27). The local XML content services in the core CMS sends a reply to the XML request broker in the core CMS that synchronization was successful (step 28). The XML request broker in the core CMS then sends a message to the import action in the application code that synchronization was successful (step 29).

Note that FIG. 10 assumes a particular implementation for the content management system 170 in FIG. 3 that could vary within the scope of the disclosure and claims herein. The steps in FIG. 10 are shown to illustrate one specific implementation, without limiting the application of the disclosure and claims herein to any specific implementation.

While the specific examples above define a first threshold for the value-add application and a second threshold for the core CMS, other thresholds could be defined and used in the content management system. For example, the value-add application could have three different thresholds, the first for linking, the second for bursting, and the third for synchronization. The disclosure and claims herein extend to any suitable type and number of thresholds in the content management system that determine when to offload a requested XML content management service to a dedicated XML processing server.

The specific examples above show linking, bursting and synchronization as three specific XML content services that may be implemented in a tiered manner in the content management system. Note, however, that other XML content services could also be included, whether currently known or developed in the future.

The content management system disclosed herein includes XML content services that are defined in multiple tiers. One or more thresholds determine whether processing of an XML content service is offloaded to a dedicated XML processing server. One or more callback services may be called when an XML content service needs to send or receive information to complete its task. The result is a very powerful and flexible architecture for a content management system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for processing extensible markup language (XML) content in a content management system, the method comprising the steps of:
   providing at least one processor;
   providing a memory coupled to the at least one processor;
   providing a content management system residing in the memory and executed by the at least one processor, the content management system performing the steps of:
      providing a first set of XML content services in a value-add application;
      providing a second set of XML content services in a dedicated XML processing server;
      providing a third set of XML content services in a core content management system; and
      the value-add application determining at a time a selected XML content service is requested in the value-add application when to process the selected XML content service using the first set of XML content services and when to offload the selected XML content service to the second set of XML content services in the dedicated XML processing server, wherein the value-add application determines to process the selected XML content service using the first set of XML content services when an estimated use of resources for the selected XML content service is less than a threshold for estimated use of resources, and determines to offload the selected XML content service to the second set of XML content services when the estimated use of resources for the selected XML content service is greater than the threshold for estimated use of resources.

2. The method of claim 1 further comprising the step of the core content management system determining at a time a second selected XML content service is requested in the core content management system when to process the selected XML content service using the third set of XML content services and when to offload the selected XML content service to the second set of XML content services in the dedicated XML processing server.

3. The method of claim 1 further comprising:
providing a fourth set of XML content services in a second dedicated XML processing server; and
the core content management system determining at a time a third selected XML content service is requested in the core content management system when to process the selected XML content service using the third set of XML content services and when to offload the selected XML content service to the fourth set of XML content services in the second dedicated XML processing server.

4. The method of claim 1 wherein the estimated use of resources comprises estimated use of memory by the selected XML content service.

5. The method of claim 1 further comprising the steps of:
providing a first set of XML callback services in the value-add application;
providing a second set of XML callback services in the dedicated XML processing server;
providing a third set of XML callback services in the core content management system;
wherein each set of XML callback services includes a plurality of functions to send and receive information when needed by the selected XML content service.

6. A computer-implemented method for processing extensible markup language (XML) content in a content management system, the method comprising the steps of:
providing at least one processor;
providing a memory coupled to the at least one processor;
providing a content management system residing in the memory and executed by the at least one processor, the content management system performing the steps of:
providing a first set of XML content services in a value-add application;
providing a second set of XML content services in a dedicated XML processing server;
providing a third set of XML content services in a core content management system;
providing a first set of XML callback services in the value-add application;
providing a second set of XML callback services in the dedicated XML processing server;
providing a third set of XML callback services in the core content management system;
wherein each set of XML callback services includes a plurality of functions to send and receive information when needed by the selected XML content service;
the core content management system determining at a time a first selected XML content service is requested in the core content management system when to process the first selected XML content service using the third set of XML content services and when to offload the first selected XML content service to the second set of XML content services in the dedicated XML processing server; and
the value-add application determining at a time a second selected XML content service is requested in the value-add application when to process the second selected XML content service using the first set of XML content services and when to offload the second selected XML content service to the second set of XML content services in the dedicated XML processing server, wherein the second selected XML content service is processed using the first set of XML content services when an estimated use of memory for the second selected XML content service is less than a threshold for estimated use of memory, and the second selected XML content service is offloaded to the second set of XML content services when the estimated use of memory for the second selected XML content service is greater than the threshold for estimated use of memory.

* * * * *